(12) United States Patent
Omata et al.

(10) Patent No.: US 6,518,978 B1
(45) Date of Patent: Feb. 11, 2003

(54) IMAGE-DISPLAY EDIT PROCESSING METHOD, IMAGE EDITING APPARATUS AND STORAGE MEDIUM

(75) Inventors: Mitsuteru Omata, Ebina (JP); Hirokazu Amemiya, Ebina (JP); Noriyuki Kurokami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/323,253

(22) Filed: Jun. 1, 1999

(30) Foreign Application Priority Data

May 29, 1998 (JP) .......................................... 10-148174

(51) Int. Cl.$^7$ ................................................ G06F 3/14
(52) U.S. Cl. ...................................... 345/723; 345/704
(58) Field of Search ................................... 345/704, 731, 345/719–726, 835–839, 730–732, 853–855, 860, 818–820, 828–830; 348/722, 234, 578

(56) References Cited

U.S. PATENT DOCUMENTS

| | | | | |
|---|---|---|---|---|
| 5,537,528 A | * | 7/1996 | Takahashi et al. | .......... 345/731 |
| 5,692,213 A | * | 11/1997 | Goldberg et al. | ........... 345/731 |
| 5,699,089 A | * | 12/1997 | Murray | ........................ 345/732 |
| 5,717,869 A | * | 2/1998 | Moran et al. | ................ 345/704 |
| 5,809,245 A | * | 9/1998 | Zenda | ......................... 345/731 |
| 5,850,221 A | * | 12/1998 | Macrae et al. | .............. 345/853 |
| 5,929,857 A | * | 7/1999 | Dinallo et al. | ............. 345/719 |
| 5,956,026 A | * | 9/1999 | RatakondA | .................. 345/723 |
| 5,995,091 A | * | 11/1999 | Near et al. | ................... 345/302 |
| 6,037,940 A | * | 3/2000 | Schroeder et al. | .......... 345/853 |
| 6,052,508 A | * | 4/2000 | Mincy et al. | ................. 386/96 |
| 6,166,314 A | * | 12/2000 | WeINhstock et al. | ...... 84/483.1 |
| 6,192,183 B1 | * | 2/2001 | TaniGuchi et al. | ........... 386/52 |
| 6,204,840 B1 | * | 3/2001 | Petelycky et al. | .......... 345/302 |
| 6,239,801 B1 | * | 5/2001 | Chiu et al. | .................. 345/835 |
| 6,268,864 B1 | * | 7/2001 | Chen et al. | ................. 345/428 |
| 6,353,461 B1 | * | 3/2002 | Shore et al. | ................ 348/722 |

* cited by examiner

*Primary Examiner*—Steven Sax
(74) *Attorney, Agent, or Firm*—Antonelli, Terry, Stout & Kraus, LLP

(57) ABSTRACT

When an image input button, an image to be edited is acquired and selected pieces of picture data representing the acquired image is displayed. With an order to play back pieces of image data corresponding to the selected pieces of picture data, a play back order is specified by display indicators. When an image output button is pressed, pieces of image data corresponding to the selected pieces of picture data are played back in the specified play back order.

17 Claims, 11 Drawing Sheets

| NUMBER | LINE TYPE | SPECIAL EFFECT |
|---|---|---|
| 1 | STRAIGHT LINE | NONE |
| 2 | DOTTED LINE | FEED-IN/FEED-OUT |
| 3 | DASHED LINE | SLIDE |
| 4 | WAVED LINE | WIPE |
| 5 | DOUBLE LINE | DISSOLVE |
| 6 | DOUBLE DOTTED LINE | ROLL BACK |

LINE-TYPE TABLE 53

| NUMBER | PICTURE DATA | IMAGE-DATA NAME |
|---|---|---|
| 1 | - | IMAGE FILE 1 |
| 2 | - | IMAGE FILE 2 |
| 3 | - | IMAGE FILE 3 |
| 4 | - | IMAGE FILE 4 |
| 5 | - | IMAGE FILE 5 |
| 6 | - | IMAGE FILE 6 |
| 7 | - | IMAGE FILE 7 |
| 8 | - | IMAGE FILE 8 |
| 9 | - | IMAGE FILE 9 |
| 10 | - | IMAGE FILE 10 |
| 11 | - | IMAGE FILE 11 |
| 12 | - | IMAGE FILE 12 |

ICON TABLE 500

FIG.7

| NUMBER | ICON NUMBER | LINE TYPE | THICKNESS |
|---|---|---|---|
| 1 | 1 | 1 | 1 |
| 2 | 3 | 1 | 1 |
| 3 | 8 | 1 | 1 |
| 4 | 10 | 1 | 1 |
| 5 | 6 | 1 | 1 |

EDIT TABLE 600

| NUMBER (1201) | PATTERN (1203) | SPECIAL EFFECT (1205) |
|---|---|---|
| 1 | | NONE |
| 2 | | FEED-IN/FEED OUT |
| 3 | | SLIDE |
| 4 | | WIPE |
| 5 | | DISSOLVE |
| 6 | | ROLL BACK |

55 PATTERN TABLE

| NUMBER 1501 | ICON NUMBER 1503 | PATTERN 1505 | | WIDTH 1507 | |
|---|---|---|---|---|---|
| 1 | 1 | 1 | 5 | 50 | 50 |
| 2 | 3 | 5 | 3 | 60 | 40 |
| 3 | 8 | 3 | 1 | 50 | 50 |
| 4 | 10 | 1 | 2 | 10 | 90 |
| 5 | 6 | 2 | 1 | 50 | 50 |

EDIT TABLE 1500

IMAGE-DISPLAY EDIT PROCESSING METHOD, IMAGE EDITING APPARATUS AND STORAGE MEDIUM

BACKGROUND OF THE INVENTION

In general, the present invention relates to an image-display editing method, an image editing apparatus and a storage medium for storing a program for carrying out the method. More particularly, the present invention relates to a man/machine interface for an image displaying and editing method.

In the conventional method of editing a plurality of pieces of image data, such as the method disclosed in Japanese Patent Laid-Open No. Hei 4-117686, the user of an image edit system displays some or all frames of a plurality of pieces of image data, rearranges the frames along a time axis and connects the rear end of an image to the front end of another image in the process of editing the images. In addition, according to a method of editing an image program, as disclosed in Japanese Patent Laid-Open No. Hei 7-46462, a plurality of pieces of image data and special-effect programs are displayed for each added track along the time axis in order to edit them as a single piece of image data.

In a method in which some or all frames of a plurality of pieces of image are displayed on a screen of an image editing system, some pieces of image data may be replaced by others. In this case, it is necessary to remove a replaced one and connect a replacement one to the remaining image data. As a result, the editing work becomes troublesome and requires a long time to complete. As for the method of editing an image program, as disclosed in Japanese Patent Laid-Open No. Hei 7-46462, it is difficult to verify edit results, such as the order of playback of pieces of image data and a special effect performed at each image-data change-over, unless the edit results are played back. Thus, problems arise such as difficulty in using the method and a long time to complete the editing work.

SUMMARY OF THE INVENTION

It is thus an object of the present invention, in addressing the problems described above, to provide an image-display edit processing method, which is easy to use, so that the time it takes to carry out the editing of an image can be shortened, an image editing apparatus adopting the method and a storage medium for storing a program for implementing the method.

In order to achieve the object described above, the present invention provides an image-display edit processing method adopted in an image editing apparatus having a display unit for displaying image data. The method comprises:
 a step of displaying a plurality of pieces of picture data each corresponding to a piece of image data on the display unit;
 a step of inputting a command entered by the user and displaying display indicators representing a playback order to play back the pieces of image data by associating the display indicators with the displayed pieces of picture data in accordance with the command; and
 a step of playing back the pieces of image data corresponding to the pieces of picture data in the playback order specified by the display indicators.

The plurality of pieces of image data can be controlled by an image file or a plurality of image files. In addition, the method for achieving the object is further provided with a step of displaying pieces of picture data by rearranging the pieces of picture data along a time axis in the playback order specified by the display indicators and playing back the pieces of image data corresponding to the pieces of picture data in the playback order. Moreover, the method for achieving the object also determines a special effect to be used at a change-over of image data based on a display attribute of the display indicators specifying the playback order. Furthermore, the method for achieving the object also determines a duration of a change-over of image data based on a display attribute of the display indicators specifying the playback order.

In addition, in order to achieve the object described above, the present, invention also provides an image-display edit processing method adopted in an image editing apparatus having a processing unit, a storage unit, a display unit and an input unit. The method comprises:
 a step of displaying a plurality of pieces of picture data each corresponding to a piece of image data on the display unit;
 a step of displaying display indicators specifying a display order in accordance with a command issued by the user on the displayed pieces of picture data; and
 a step of playing back pieces of image data corresponding to/the displayed pieces of picture data in the playback order specified by the display indicators.

In addition, in the method for achieving the object, pieces of image data each corresponding to a piece of picture data are sequentially played back in said playback order specified by said display indicators before editing at least one piece of image data and storing the edited pieces of image data in the storage unit. Furthermore, in the method for achieving the object, the display indicators for specifying the playback order are each represented by a connecting line drawn from a piece of picture data to another piece of picture data. Moreover, in the method for achieving the object, the playback order is determined by the direction of an arrow on the connecting line. In addition, in the method for achieving the object, the type of the connecting line determines a special effect to be used at an image-data change-over time. Furthermore, in the method for achieving the object, the thickness of the connecting line determines a duration of a change-over of image data.

In addition, in order to achieve the object described above, the present invention provides an image-display edit processing method adopted in an image editing apparatus having a display unit for displaying image data. The method comprises:
 a step of displaying a plurality of pieces of picture data each corresponding to a piece of image data on the display unit;
 a step of determining a playback order in accordance with an order in which the pieces of picture data are displayed, that is, a step of specifying pieces of picture data sequentially by typically clicking a mouse in a playback order desired by the user; and
 a step of playing back pieces of image data corresponding to the pieces of picture data in the playback order determined at the above step.

In addition, in order to achieve the object described above, the present invention provides an image editing apparatus having a display unit for displaying image data. The apparatus further comprises:
 first display means for displaying a plurality of pieces of picture data each corresponding to a piece of image data on the display unit;

second display means for inputting a command entered by the user and displaying display indicators representing a playback order to play back the pieces of image data by associating the display indicators with the pieces of picture data in accordance with the command; and playback means for playing back pieces of image data corresponding to the pieces of picture data in the playback order specified by the display indicators.

In addition, the apparatus for achieving the object is further provided with third display means for displaying pieces of picture data by rearranging the pieces of picture data along a time axis in the playback order specified by the display indicators and playing back the pieces of image data corresponding to the pieces of picture data in the playback order. Furthermore, the apparatus for achieving the object also determines a special effect to be used at time of image-data change-over and a duration of a change-over of image data on the basis of display attributes of the display indicators specifying the playback order. Moreover, in the apparatus for achieving the object, the second display means displays the display indicators representing a playback order on the displayed pieces of picture data. In addition, in the apparatus for achieving the object, the display indicators for specifying the playback order are each represented by a connecting line drawn from a piece of picture data to another piece of picture data. In addition, in the apparatus achieving the object, the type of the connecting line determines a special effect to be used at the time of an image-data change-over. It should be noted that an image-display editing program executed to carry out functions implemented by the methods and the apparatus described above can be stored in a storage medium.

DETAILED DESCRIPTION OF THE PREFERRED EMBODIMENTS

The present invention will become more apparent from the following detailed description of various preferred embodiments with reference to the accompanying drawings.

Figure 1:
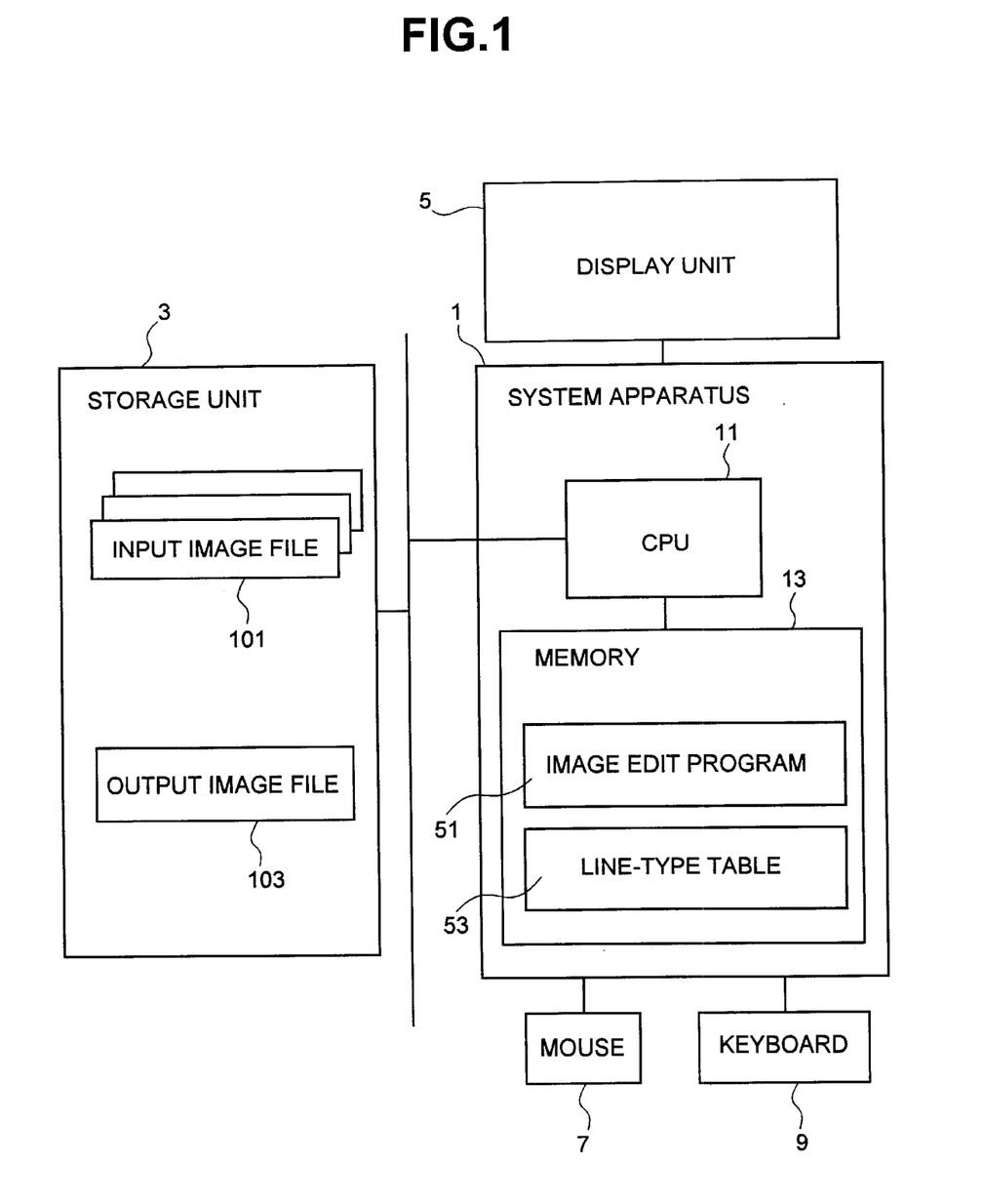
FIG. 1 is a diagram block showing the overall configuration of a system according to an image edit program implemented a first embodiment of the present invention.

FIG. 1 is a diagram showing the overall configuration of a system implementing an image edit program according to a first embodiment of the present invention. In processing to edit image data according to the first embodiment, at least a piece of picture data representing the image data is displayed to show the image data, and an order to play back image data can be specified by drawing a line between displayed pieces of picture data. Picture data representing image data in the embodiment includes static picture data immediately following a change in scene on an image represented by the image data, some pieces of static picture data on an image specified by the user and static picture data sampled from an image at fixed intervals. The picture data corresponds the image data and represents the image data.

A method and an apparatus implemented by the embodiment will be described with reference to FIGS. 1–4.

To begin with, the overall configuration of the embodiment will be explained with reference to FIG. 1. In the figure, reference numeral 1 denotes a system apparatus implemented typically by a work station or a personal computer, which will be abbreviated hereafter to WS or PC, respectively. Reference numeral 3 denotes a data storage unit, such as a magnetic-disc drive, and reference numeral 5 denotes an output unit represented by a display unit. Reference numeral 7 denotes a pointing device represented by a mouse and reference numeral 9 denotes an input unit represented by a keyboard.

Reference numerals 11 and 13 denote respectively a central processing unit (CPU) and a memory unit which are employed in the system apparatus 1. The memory unit 13 is used for storing an image edit program 51 for reading out image data and picture data corresponding to image data from the data storage unit 3, displaying for picture data and for editing image data. Also stored in the memory unit 13 is a line-type table 53 used for associating a line type with a special effect. The line-type table 53 will be described in more detail later.

The data storage unit 3 is used for storing input image files 101 and an output image file 103. Identified by a file name or a file identifier, an input image file 101 is provided for each image. The output image file 103 is image data obtained as a result of editing work carried out by using the system apparatus 1. It should be noted that FIG. 1 does not show an input/output area for the input and output image files 101 and 103 and a work area for execution of the image edit program 51, in order to make the diagram simple.

Next, the line-type table 53 will be explained by referring to FIG. 2. As described above, a plurality of pieces of picture data each corresponding to a piece of image data are displayed on a screen, and a line is drawn to connect two pieces of picture data displayed on the screen to specify an order in which the pieces of image data are to be played back in this embodiment. A line drawn to connect two pieces of picture data has characteristics as shown in the line-type table 53. As shown by the table, each line type corresponds to a special-effect program. Assume that a line of a certain type is drawn to connect a first piece of picture data to a second piece of picture data. In this case, a piece of image data corresponding to the first piece of picture data is reproduced before a piece of image data corresponding to the second piece of picture data during a playback operation. At the time of change-over from the former piece of image data to the latter piece of image data, a special-effect program corresponding to the type of drawn line is carried out.

Figure 2:
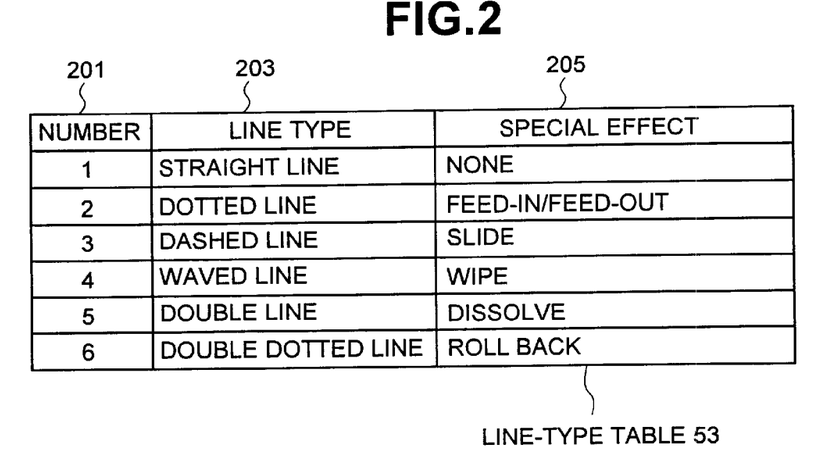
FIG. 2 is a diagram in the form of a table showing relations between types of edit lines and special effects.

As shown in FIG. 2, each record of the line-type table is given a number 201 for identifying the record, the line type 203 and a special-effect program 205 corresponding to a line identified by the line type 203. Assume that a dotted line representing a feed-in/feed-out effect is drawn to connect a first piece of picture data to a second piece of picture data. In this case, an image-data change-over takes place through a feed-in/feed-out effect during a playback operation. It should be noted that a line type 203 in the line-type table 53 shown in FIG. 2 can be described in terms of a number identifying the line type 203 and data identifying the special-effect program for the line type. In addition, while each piece of data in the line-type table 53 shown in FIG. 2 is described literally, any other method to describe the data can be adopted as long as the method can be used to identify the data.

Figure 3:
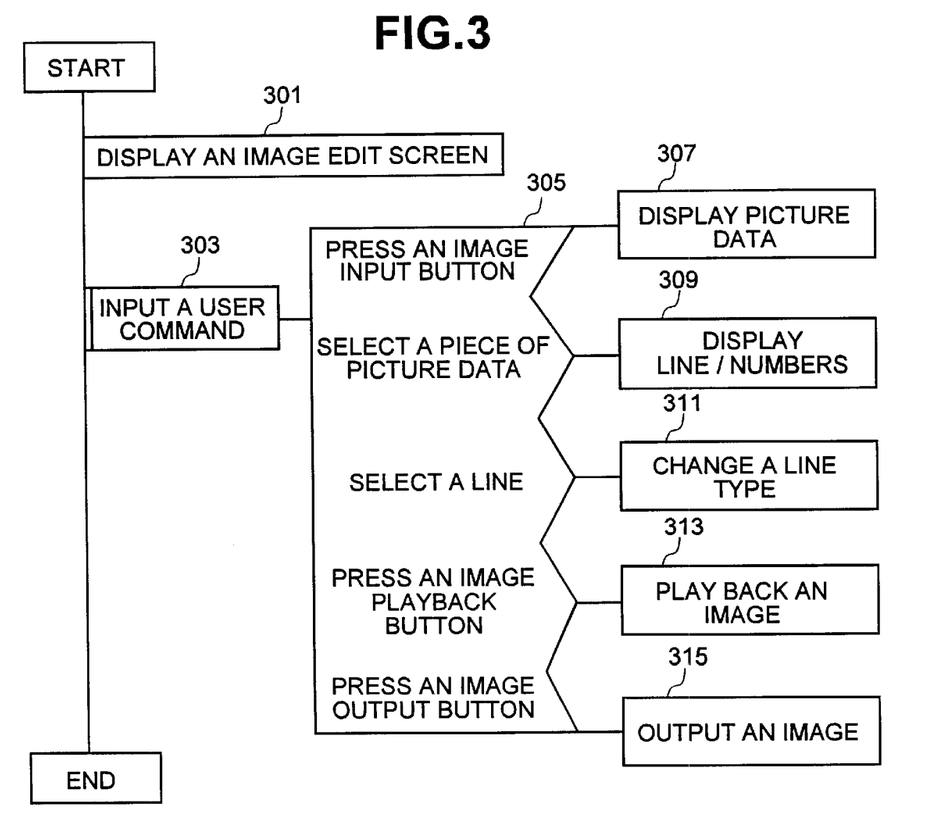
FIG. 3 is a flowchart representing processing of an image edit program implemented by the first embodiment.

Next, processing of the image edit program 51 will be described with reference to the flowchart shown in FIG. 3 and the display screens shown in FIGS. 4 and 5. FIG. 3 is a flowchart representing processing of an image edit program implemented by the first embodiment, FIG. 4 is a diagram showing a typical result output to a display unit by the image edit program implemented by the first embodiment and FIG. 5 is a diagram showing another typical result output to a display unit by the image edit program 51.

Figure 4:
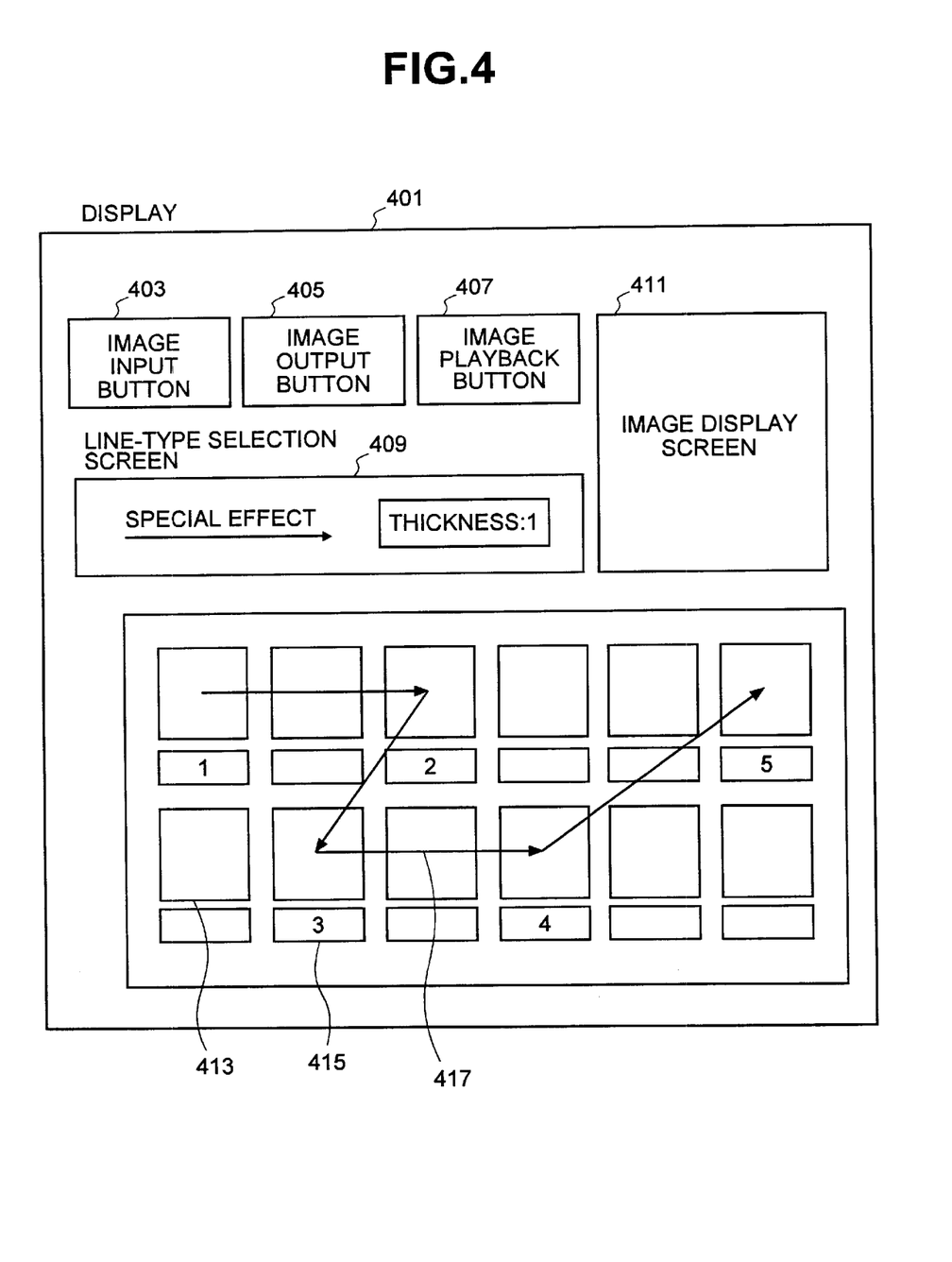
FIG. 4 is a diagram showing a typical result output to a display unit by the image edit program implemented by the first embodiment.

As shown in FIG. 3, when the image edit program 51 is invoked, the flowchart begins with a step 301 at which an image edit screen 401 like the one shown in FIG. 4 is displayed on the display unit 5.

As shown in FIG. 4, the image edit screen 401 include an image input button 403, an image output button 405, an image playback button 407, a line-type-selection screen 409 and an image display screen 411. Below the buttons 403, 405 and 407 and the screens 409 and 411, an area for displaying pieces of picture data (static-picture data) corresponding to image data is provided. Some of the pieces of picture data are connected to each other by a line indicating a playback order. This area is referred to hereafter as an edit area. In the edit area shown in FIG. 4, some of the pieces of picture data corresponding to image data have already been connected to each other by a line. It should be noted, however, that the edit area displays nothing right after the invocation of the image edit program 51.

Figure 5:
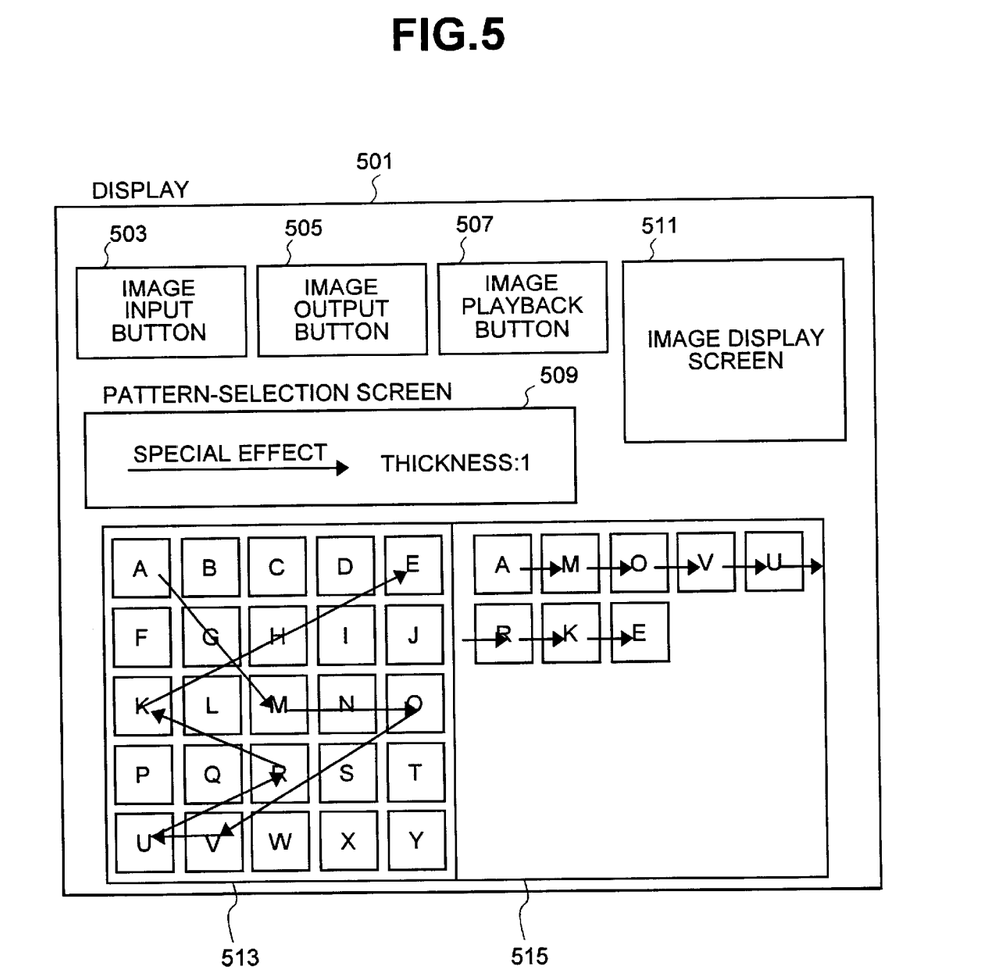
FIG. 5 is a diagram showing another typical result output to a display unit by the image edit program.

In the diagram of FIG. 5, the edit area is split into a first edit area 513 and a second edit area 515. Much like the edit area shown in FIG. 4, some pieces of picture data (static-picture data) corresponding to image data are connected to each other by a line indicating an order in which the image data are played back in the first edit area 513. In the second edit area 515, on the other hand, the pieces of picture data connected to each other by a line indicating a playback order in the first edit area 513 are rearranged along the time axis. Thus, with the two edit areas provided in this way, a result of editing work can be visually verified more easily by viewing the second edit area 515. In this case, each of the particular pieces of picture data can be displayed in the second edit area 515 with timing coincident with a specification of the particular piece of picture data in the first edit area 513, or some of the particular pieces of picture data can be displayed in the second edit area 515 as a batch after their playback order has been specified in the first edit area 513.

The image input button 403 shown in FIG. 4 is operated for specifying image data to be edited and the image output button 405 is operated for outputting edited image data to the data storage unit 3. The image playback button 407 is operated for playing back image data currently being edited in a specified playback order. A reproduced image is displayed on the image display screen 411. The line-type-selection screen 409 is a screen for setting and modifying the type of a line connecting pieces of picture data.

Reference numeral 413 in the edit area denotes an icon to represent a piece of picture data corresponding to a piece of image data to be edited which is read in by clicking on the image input button 403. Reference numeral 415 beneath the icon 413 representing a piece of picture data denotes a playback-order display area showing one number in a sequence of numbers indicating a playback order. Reference numeral 417 denotes an edit line which is drawn between two pieces of picture data when the second and subsequent pieces of picture data 413 are specified. A sequence of arrows on the edit line 417 indicates a playback order.

Referring back to the flowchart shown in FIG. 3, at the next step 303, the CPU 11 enters a state of waiting for an input to be entered by the user. When the user enters an input by clicking on the image input button 403, the flow of the image edit program 51 branches to a step 307. When the user enters an input by selecting a piece of picture data 413, the flow of the image edit program 51 branches to a step 309. When the user enters an input by selecting an edit line 417 displayed in the edit area, the flow of the image edit program 51 branches to a step 311. When the user enters an input by clicking on the image playback button 407, the flow of the image edit program 51 branches to a step 313. When the user enters an input by clicking on image output button 405, the flow of the image edit program 51 branches to a step 315.

As described above, when the user enters an input by clicking on the image input button 403, the flow of the image edit program 51 branches to the step 307 at which picture data is displayed.

Figure 8:
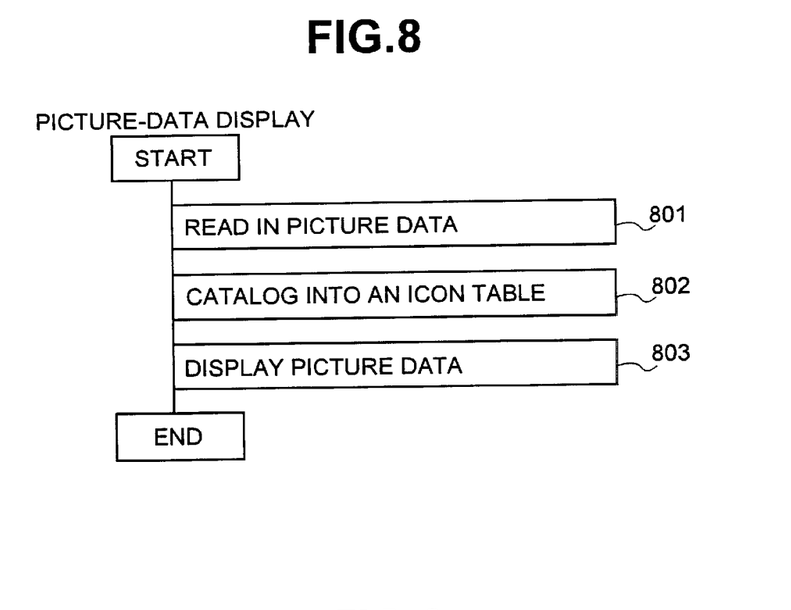
FIG. 8 is a flowchart representing picture-data display processing.

FIG. 8 is a flowchart representing picture-data display processing carried out at the step 307. As shown in the figure, the flowchart begins with a step 801 to display a screen for specifying an image to be edited from image files 101 stored in the data storage unit 3, thereby allowing user select an input image file 101 containing image data to be edited. After the user specifies an input image file 101 containing image data to be edited, static-picture data at the beginning of the image data stored in the specified input image file 101 is read in as picture data representing the image data. The flow of the picture-data display processing then goes on to a step 802 at which the picture data and the name of the image data (that is, the name of the input image file 101 containing the image data) are cataloged in an icon table 600.

Figure 6:
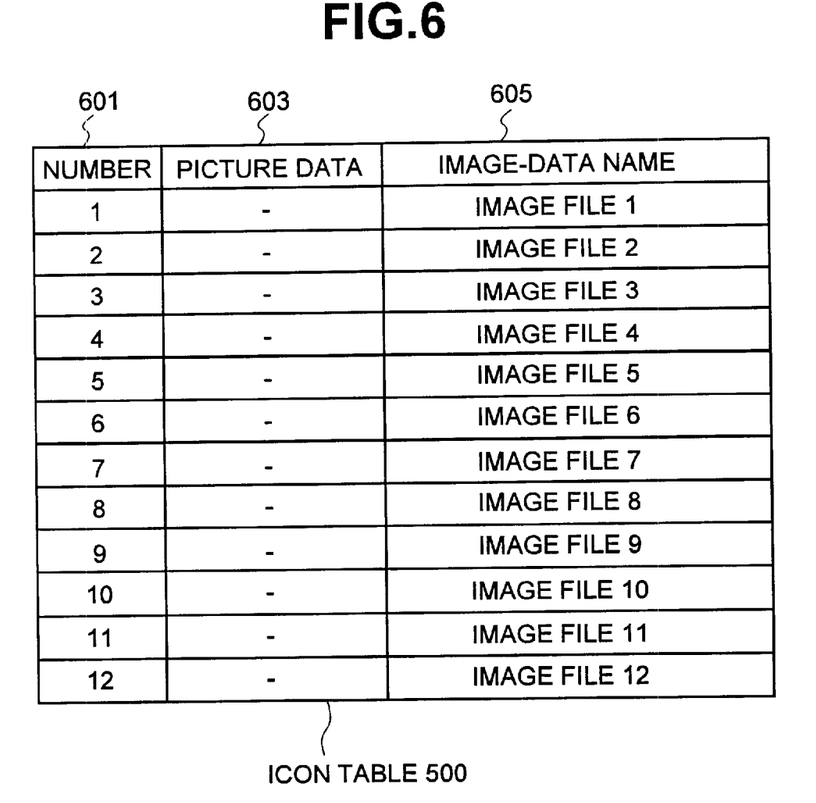
FIG. 6 is a diagram showing contents of an icon table associating picture data displayed on the screen with image data.

FIG. 6 is a diagram showing an example of the contents of the icon table 600 associating picture data displayed on the screen with image data. As shown in the figure, the icon table 600 associates image data read in from an input image file 101 with picture data displayed in the edit area. Each record of the icon table 600 comprises a number 601 for identifying picture data, the picture data 603 not shown in the figure and an image-data name 605 (that is, the name of an image file containing image data corresponding to the picture data). For example, picture data displayed in the edit area with a number 601 having a value of 1 corresponds to image data stored in image file 1. It should be noted that the picture data 603 can also be represented by a number identifying the picture data 603.

It is also worth noting that a plurality of images to be edited can be read in and the same plurality of pieces of picture data 413 corresponding to the same plurality of pieces of image data of the images can be displayed. The pieces of picture data 603 and the names 605 of the image files containing the images can be cataloged in the icon table 600. In the above description, a piece of image data corresponds to a piece of picture data. It should be noted, however, that a plurality of pieces of picture data can also each be fetched from a piece of image data to be displayed as picture data 413 representing a segment in the piece of image data. In this case, a piece of image data is divided into a plurality of segments delimited by boundaries. Image data on each of the boundaries is thus fetched as a piece of picture data. A sub-piece of image data in each of the segments is thus represented by a piece of picture data at the beginning of the segment or a piece of picture data of a picture at any position in the segment. In this case, in the icon table 600, information indicating the name 605 of an image file and a segment of an image in the image file is cataloged as image data corresponding to picture data 603. In addition, in the case of a piece of image data comprising a plurality of image scenes, the image data is divided into the same plurality of sub-pieces of image data as the image scenes and the same plurality of pieces of picture data each corresponding to a sub-piece of image data are displayed in the edit area.

Referring back to the flowchart shown in FIG. 8, at a step 803 following the step 802, the picture data cataloged in the icon table 600 is displayed as picture data (or an icon) 413 in the edit area. Then, the processing to display the image data represented by the flowchart of FIG. 8 is ended and control is returned to the step 303 of the flowchart of FIG. 3 to wait for an input to be entered by the user.

When the user enters an input by selecting a piece of picture data 413, the flow of the image edit program 51 branches to the step 309 at which processing to display a line/number is carried out.

Figure 9:
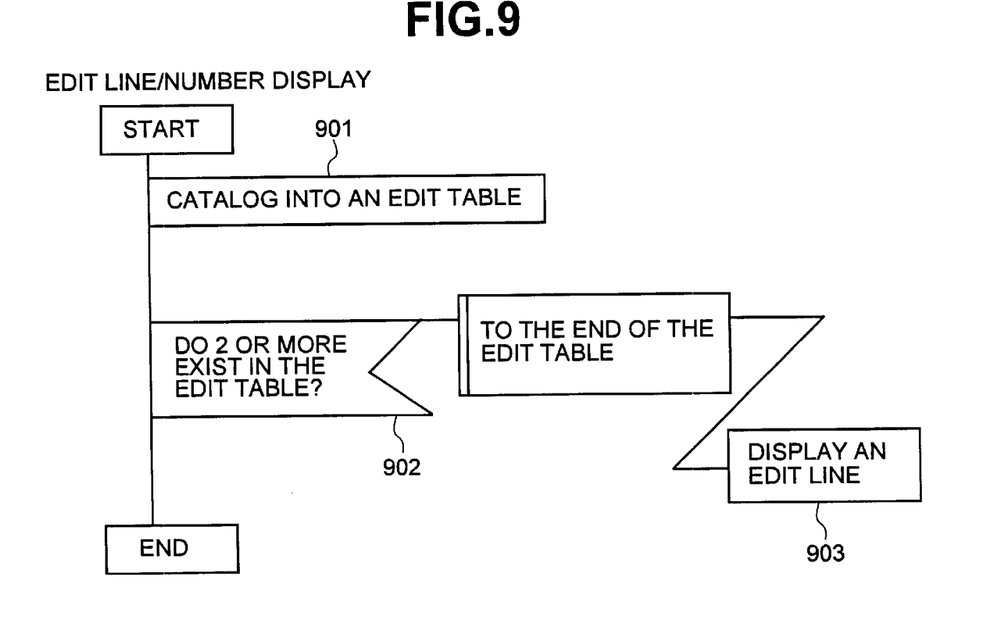
FIG. 9 is flowchart representing line/number display processing.

FIG. 9 is a flowchart representing the procedure of the line/number display processing carried out at the step 309. As shown in the figure, the flowchart begins with a step 901 to add information identifying the selected picture data and information on an edit line to an edit table 700.

Figure 7:
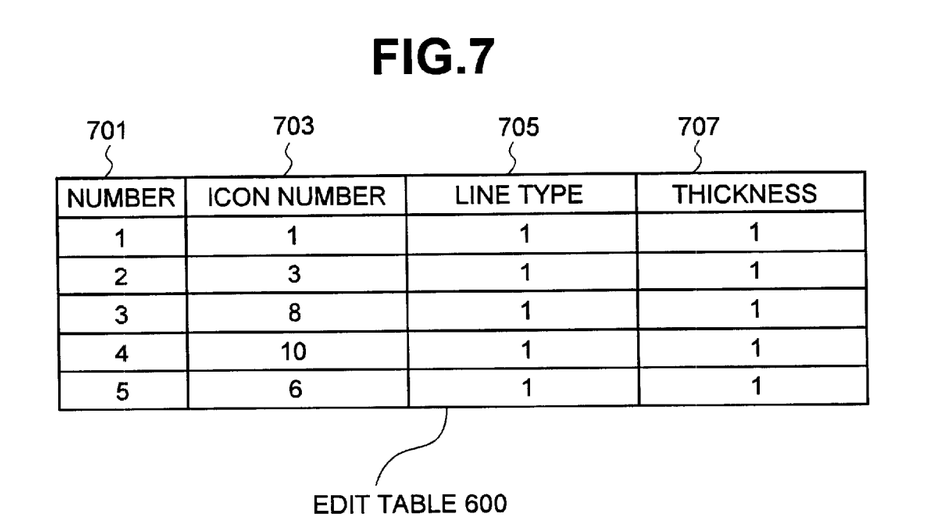
FIG. 7 is a diagram showing contents of an edit table for storing an edit order and special effects provided by the first embodiment.

FIG. 7 is a diagram showing the format of the edit table 700. As shown in the figure, each record of the edit table 700 comprises one number in a sequence of numbers 701 indicating a playback order, an icon number 703 of an icon serving as an area for storing a number 601 in the icon table 600 for the selected picture data 413, the type 705 of an edit line drawn from the picture data 413 and the thickness 707 of the edit line. A playback operation is carried out in accordance with information stored in the edit table 700. To be more specific, image data corresponding to the picture data identified by the icon number 703 is played back at this time in the playback order identified by the sequence numbers 701. When a change-over from a piece of image data to another takes place, a special effect listed in the line-type table 53 shown in FIG. 2 and indicated by the line type 705 is exhibited at the change-over from one image to another.

The thickness 707 represents the duration of a change-over. To be more specific, in the case of two pieces of picture data connected by a thick edit line, the time it takes to complete a change-over from one of the pieces of image data to the other corresponding to the two pieces of picture becomes longer in proportion to the thickness of the edit line.

Referring back to the flowchart shown in FIG. 9, at the step 901, a number 601 representing the selected picture data 413 in the icon table 600 is added to the edit table 700 as an icon number 703. The number 703 is added to the edit table 700 in an order indicated by the sequence number 701 or is cataloged at a location following the data recorded last. If the selected picture data is the first to be recorded, the picture data is cataloged in a record indicated by the sequence number 701 of 1. If the record indicated by the sequence number 701 of 1 already exists, the selected picture data is cataloged in a record indicated by the sequence number 701 of 2. At that time, as the line type 705 of the edit table 700, the line number 201 of 1 representing no special effect in the line-type table 53 is set in the newly cataloged record. As for the thickness 707 for the new record in the edit line table 700, an initial value of 1 indicating a time duration of the special effect is set in the new record.

The flow of the processing then goes on to a step 902 to determine whether two or more records already exist in the edit table 700. If two or more records already exist in the edit table 700, the flow of the processing proceeds to a step 903 to display edit lines 417 in the records up to the last one in the edit table 700 in an order indicated by the sequence numbers 701. The edit lines 417 are displayed by drawing the edit lines 417 to connect pieces of picture data identified by the icon numbers 703. The type and the thickness of each of the edit lines 417 are determined by information cataloged in the edit table 700. Then, the processing to display edit lines represented by the flowchart shown in FIG. 9 is ended and control is returned to the step 303 of the flowchart shown in FIG. 3 to wait for an input to be entered by the user.

In the processing to display edit lines represented by the flowchart shown in FIG. 9, edit lines 417 are cataloged in the edit table 700 and drawn sequentially one after another to connect pieces of picture data 413 in the edit area which are selected sequentially one after another as illustrated by the example shown in FIG. 4. In the playback-order displaying areas 415, sequence numbers representing a playback order are displayed.

When the user enters an input by selecting an edit line 417 displayed in the edit area, the flow of the image edit program 51 branches to the step 311 at which processing to modify the type of edit line is carried out.

Figure 10:
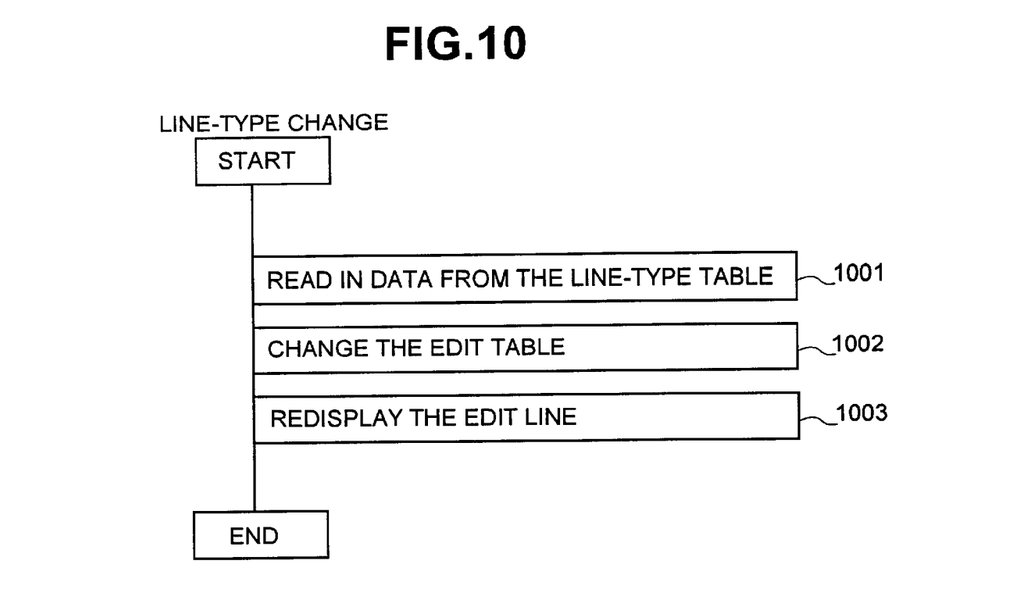
FIG. 10 is a flowchart representing line-type modification processing.

FIG. 10 is a flowchart representing the line-type modification processing carried out at the step 311. The user is capable of changing the shape of an edit line 417 to a shape representing a desired special effect by using the line-type-selection screen 409. More specifically, the user selects one of the line types listed in the line-type table 53 by using the line-type-selection screen 409. At that time, the number of the selected line type is read in from the line-type table 53 at a step 1001. At the next step 1002, the edit table 700 is updated. To put it more clearly, the line-type column 705 of the record of the edit table 700 for the selected edit line 417 is updated. At the last step 1003, the selected edit line 417 of the updated edit table 700 is displayed again before the line-type modification processing represented by the flowchart shown in FIG. 10 is ended. It should be noted that the line-type-selection screen 409 can also be used for changing the thickness of the selected edit line 417. In this case, when the user carries out an operation to change the thickness of a selected edit line 417, much like the line-type modification processing, the thickness column 707 of the record of the edit table 700 for the selected edit line 417 is updated and the selected edit line 417 of the updated edit table 700 is displayed again. After the line-type modification processing represented by the flowchart shown in FIG. 10 is ended, control is returned to the step 303 of the flowchart shown in FIG. 3 to wait for an input to be entered by the user.

When the user enters an input by pressing the image playback button 407, the flow of the image edit program 51 branches to the step 313 at which image playback processing is carried out.

Figure 11:
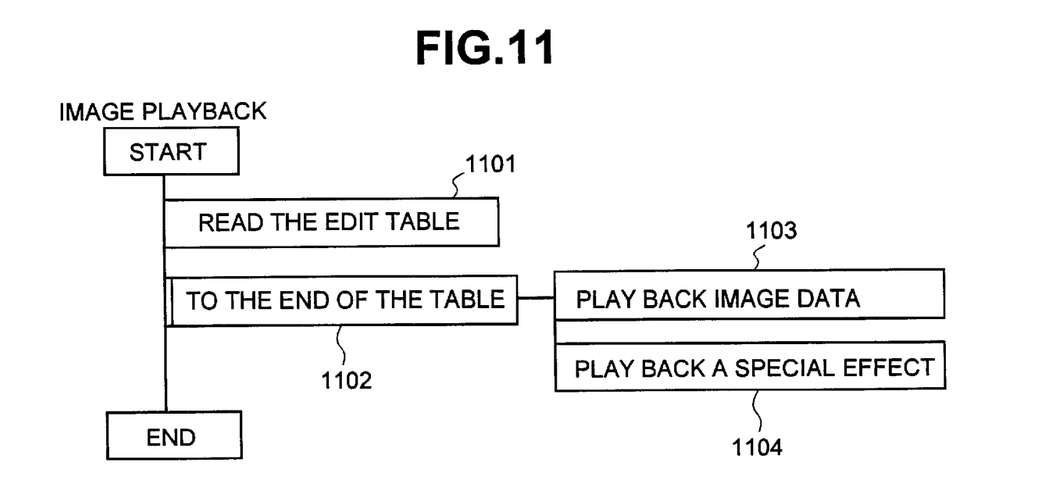
FIG. 11 is a flowchart representing image playback processing.

FIG. 11 is a flowchart representing the image playback processing carried out at the step 313. As shown in the figure, the flowchart begins with a step 1101 at which all records of the edit table 700 are read in. The flow of the processing then goes on to a step 1102 at which the processing of steps 1103 and 1104 is carried out repeatedly. At the step 1103, an icon number 703 of a record read in from the edit table 700 is used as picture data to search the icon table 600 for an input image file 101 represented by the picture data, and image data stored in the input image file 101 is then acquired and played back. At the step 1104, a special effect corresponding to the line type 705 of the same record of the edit table 700 is carried out at the time of change-over of the image data. The special effect corresponding to the line type 705 is determined by referring to the line-type table 53 shown in FIG. 2. As a result, the change-over to an image of the next record is carried out while the special effect is being exhibited. It should beg noted that, in the case of a line type 705 corresponding to no special processing, the processing of the step 1104 is not carried out.

When the user enters an input by pressing the image output button 405, the flow of the image edit program 51 branches to the step 315 at which image output processing is carried out. In the image output processing, special effects between pieces of image data each stored in an input image file 101 are stored in an order specified in the edit table 700 in an output image file 103 in the data storage unit 3 as a piece of image data.

The first embodiment implementing an image editing apparatus has been described so far. In the first embodiment, one or more pieces of picture data representing at least one piece of image data stored in a storage medium are displayed. The user then draws display indicators such as lines among the displayed pieces of picture data to specify a playback order of the pieces of image data represented by the displayed pieces of picture data. As a result, the pieces of image data can be edited with ease. In addition, a special effect at an image-data change-over can be set in the same way with ease. Moreover, a result of editing work can be verified with half an eye without the need to play back the result of the editing work. Thus, the time it takes to complete the editing work can also be shortened.

It should be noted that the order of play back of image data and the special effects available for use during image-data change-over are not limited to those provided by the first embodiment. Other playback orders and other special effects may be implemented, such as indicated by a second embodiment described as follows.

In the second embodiment, at least one piece of picture data representing a piece of image data stored in a storage medium is displayed in a process to edit the image data, and the order in which pieces of image data played back by association with the pieces of picture data using a special effect at each image-data change-over can be displayed. To put it more specifically the line-type table 53 employed in the system apparatus shown in FIG. 1 is replaced by a pattern table 55. The rest of the configuration is the same as the first embodiment. In the following description, only those configurations requiring explanation will be described.

First of all, the pattern table 55 will be explained by referring to FIG. 12. As described above, in this embodiment, a plurality of pieces of picture data representing image data are displayed. The order in which pieces of image data are played back by association with the pieces of picture data using a special effect at each image-data change-over can/also be displayed. A special effect to be displayed is determined by one of a variety of patterns shown in the pattern table 55. That is to say, the patterns each correspond to a special-effect program.

Figure 12:
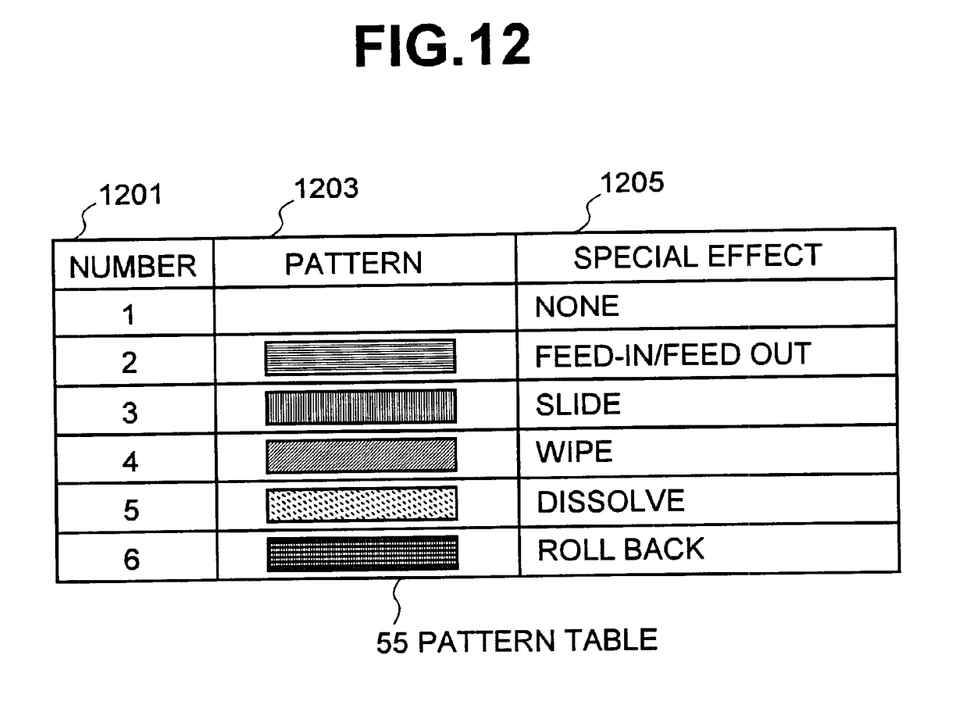
FIG. 12 is a diagram in the form of a table showing a relation between patterns and special effects.

As shown in FIG. 12, each record of the pattern table 55 comprises a number 1201 for identifying a pattern, data 1203 representing the pattern and an identification 1205 of a special-effect program associated with the pattern. It should be noted that, in the pattern table 55, the data 1203 representing a pattern can of course have a structure comprising a number for identifying the pattern and an identification of a special-effect program associated with the pattern. In addition, the data 1203 representing a pattern as shown in FIG. 12 is the pattern itself. It is worth noting, however, that any other representation of a pattern can be adopted as long as the representation is data that can be used to represent the pattern.

Figure 13:
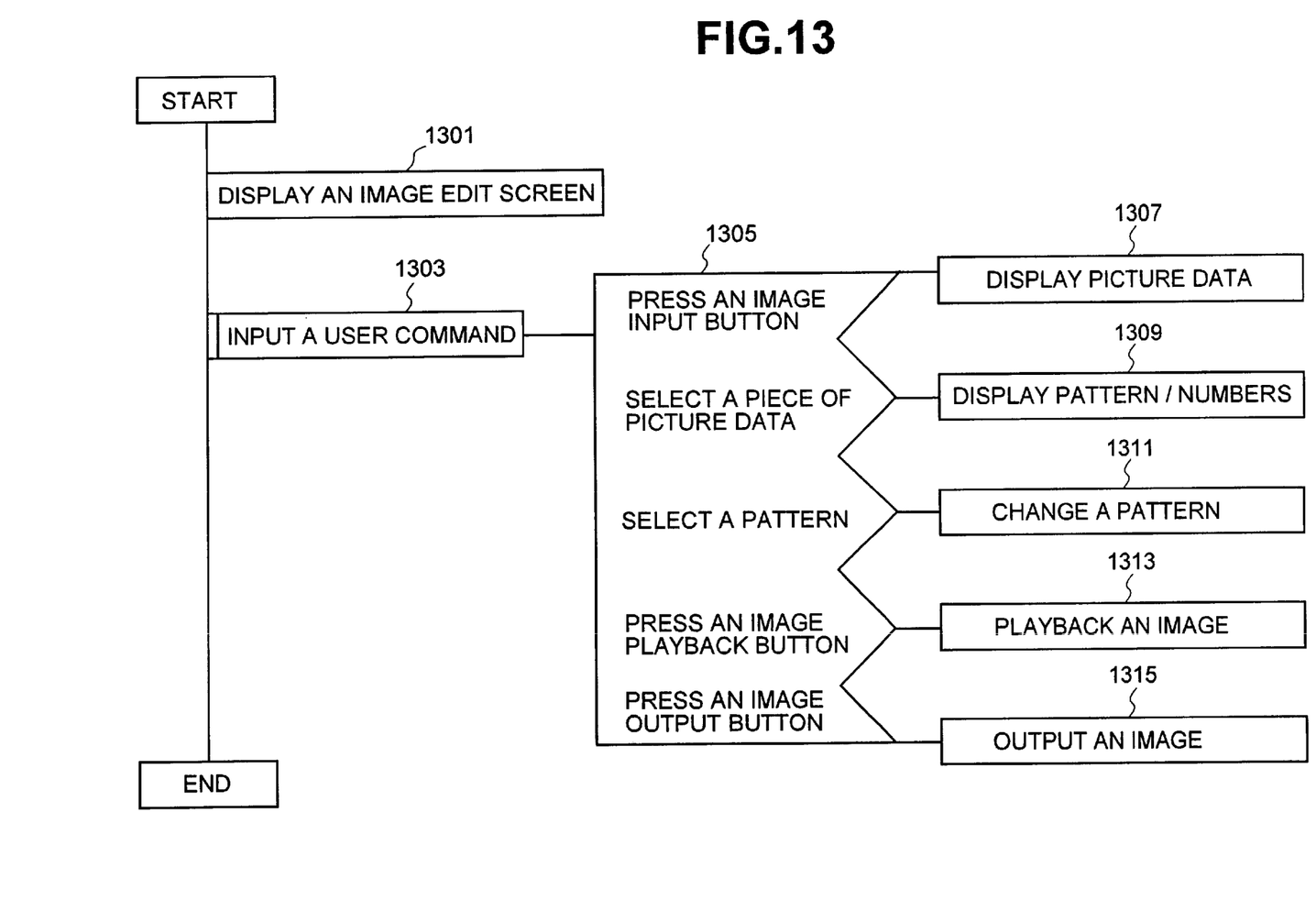
FIG. 13 is a processing flowchart representing an image edit program implemented by a second embodiment.
Figure 14:
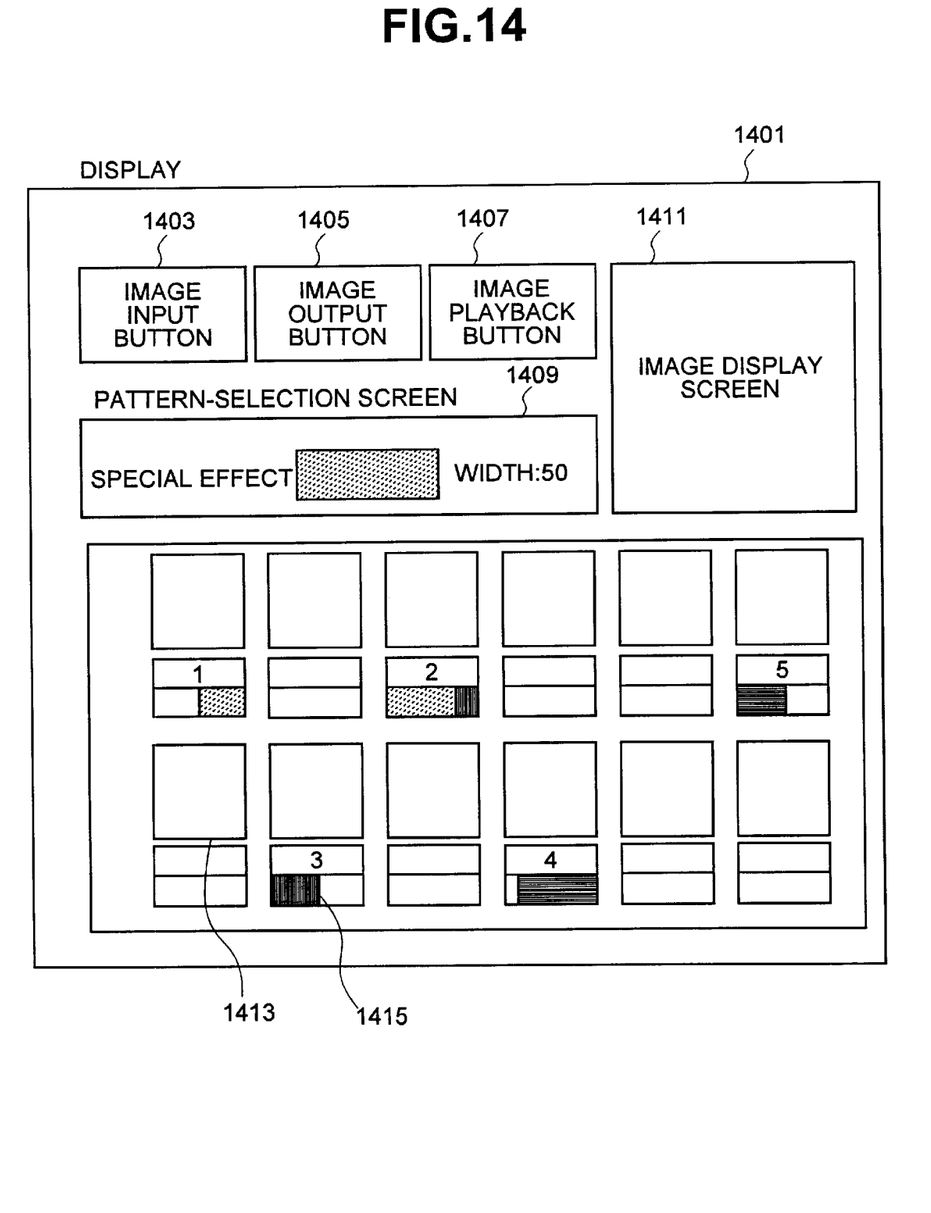
FIG. 14 is a diagram showing a typical result of the image edit program implemented by the second embodiment output to a display unit.

Next, processing details of the image edit program 51 will be explained by referring to the flowchart and screen shown FIGS. 13 and 14, respectively. FIG. 13 is a processing flowchart representing the image edit program 51 as implemented by the second embodiment. FIG. 14 is a diagram showing a typical result of the image edit program 51 output to a screen of the display unit 5.

As shown in FIG. 13, the flowchart begins with a step 1301 when the image edit program 51 is invoked. At the step 1301, an image edit screen 1401 like the one shown in FIG. 14 is displayed on the display unit 5.

As shown in FIG. 14, the image edit screen 1401 include image input button 1403, an image output button 1405, an image playback button 1407, a pattern-selection screen 1409 and an image display screen 1411. Below the buttons 1403, 1405 and 1407 and the screens 1409 and 1411, an edit area is provided. In the case of the first embodiment, some of pieces of picture data in the edit area are connected to each other by a line indicating a playback order. In the case of the second embodiment, on the other hand, display areas 1415 beneath the pieces of picture data 1413 are used for displaying a playback order and special effects. The pattern-selection screen 1409 is a screen for setting and modifying a pattern displayed in a display area 1415 beneath apiece of picture data 1413.

Referring back to the flowchart shown in FIG. 13, at the next step 1303, the CPU 11 enters a state of waiting for an input to be entered by the user. When the user enters an input by pressing the image input button 1403, the flow of the image edit program 51 branches to a step 1307. When the user enters an input by selecting a piece of picture data 1413, the flow of the image edit program 51 branches to a step 1309. When the user enters an input by selecting a pattern displayed in the edit area, the flow of the image edit program 51 branches to a step 1311. When the user enters an input by pressing the image playback button 1407, the flow of the image edit program 51 branches to a step 1313. When the user enters an input by pressing the image output button 1405, the flow of the image edit program 51 branches to a step 1315.

Figure 15:
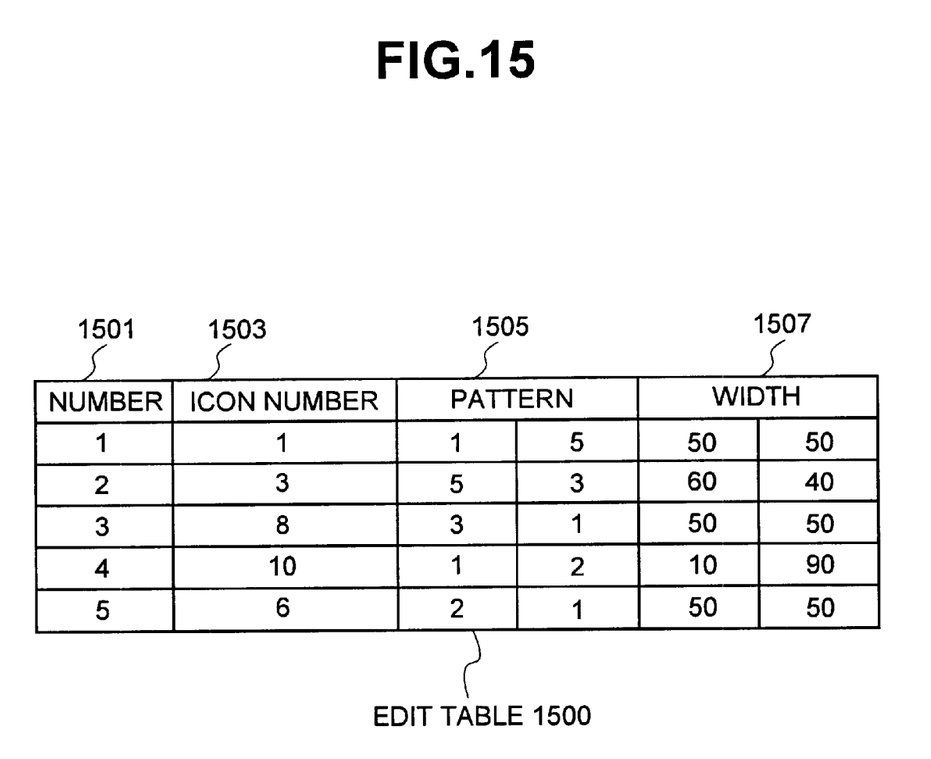
FIG. 15 is a diagram showing contents of an edit table for storing an edit order and special effects provided by the second embodiment.

FIG. 15 is a diagram showing the format of an edit table 1500. As shown in the figure, each record of the edit table 1500 comprises one number in a sequence of numbers 1501 indicating a playback order, an icon number 1503 of an icon serving as an area for storing a number 601 in the icon table 600 for the selected picture data 1413, a pattern 1505 associated with the picture data 1413 and the width 1507 of the pattern 1505. The pattern 1505 has two fields. The front-half field is referred to after the image has been switched to another while the rear-half field is referred to before the image is switched to another. By the same token, the width 1507 also has 2 fields. The rear-half field is referred to after the image has been switched to another while the front-half field is referred to before the image is switched to another. The width 1507 represents the duration of one change-over. To be more specific, in the case of a large width, the time it takes to complete a change-over from a piece of image data to another becomes longer in proportion to the magnitude of the width. A playback operation is carried out in accordance with information stored in the edit table 1500. To be more specific, this piece of image data corresponding to a piece of picture data identified by the icon number 1503 is played back at the time in the playback order identified by the sequence number 1501. When a change-over from a piece of image data to another takes place, time indicated by the width 1507 and a special effect indicated by the pattern 1505 listed in the pattern table 55 in FIG. 12 are exhibited at the change-over.

The image editing apparatus implemented by the second embodiment has been described so far. In the case of the second embodiment, a pattern displayed in a display area 1415 beneath a piece of picture data 1413 indicates a special effect. It should be noted, however, that implementations of the present invention are not limited to this embodiment. For example, a background color of a display area can be used to indicate an attribute such as a special effect at the time of image-data change-over or a playback time.

As described above, the embodiments of the present invention allow an order to play back pieces of image data to be specified with ease so as to make the edit work simple. In addition, special effect to be exhibited at the time of image-data change-over can also be set with ease.

What is claimed is:

1. An image-display edit processing method adopted in an image editing apparatus having a display unit for displaying image data, said method comprising:
   a step of displaying on said display unit a plurality of pieces of picture data each corresponding to a piece of image data;
   a step of selecting pieces of picture data by the user and displaying display indicators representing a playback order to play back pieces of image data corresponding to said selected pieces of picture data by associating said display indicators with said selected pieces of picture data; and
   a step of playing back said pieces of image data corresponding to said selected pieces of picture data in said playback order specified by said display indicators wherein pieces of image data each corresponding to a selected piece of picture data are sequentially played back in said playback order specified by said display indicators before editing.

2. An image-display edit processing method according to claim 1 further comprising:
   a step of displaying pieces of picture data by rearranging said selected pieces of picture data along a time axis in said playback order specified by said display indicators and playing back said pieces of image data corresponding to said selected pieces of picture data in said playback order specified by said display indicators.

3. An image-display edit processing method according to claim 1 wherein plurality of pieces of image data are controlled by an image file.

4. An image-display edit processing method according to claim 1 wherein determination of a special effect at an image-data change-over is based on a display attribute of said display indicators specifying said playback order.

5. An image-display edit processing method according to claim 4 wherein determination of a duration of an image-data change-over is based on a display attribute of said display indicators specifying said playback order.

6. An image-display edit processing method adopted in an image editing apparatus having a processing unit, a storage unit, a display unit and an input unit, said method comprising:
   a step of displaying a plurality of pieces of picture data each corresponding to a piece of image data on said display unit;
   a step of displaying display indicators specifying a display order in accordance with a selection of pieces of picture data by the user on said selected pieces of picture data; and
   a step of playing back pieces of image data corresponding to said selected pieces of picture data in said playback order specified by said display indicators,
   wherein pieces of image data each corresponding to a selected piece of picture data are sequentially played back in said playback order specified by said display indicators before editing at least one piece of image data and storing edited pieces of image data in said storage unit.

7. An image-display edit processing method adopted in an image editing apparatus having a processing unit, a storage unit, a display unit and an input unit, said method comprising:
   a step of displaying a plurality of pieces of picture data each corresponding to a piece of image data on said display unit;
   a step of displaying display indicators specifying a display order in accordance with a selection of pieces of picture data by the user on said selected pieces of picture data; and
   a step of playing back pieces of image data corresponding to said selected pieces of picture data in said playback order specified by said display indicators,
   wherein said display indicators for specifying said playback order are each represented by a connecting line drawn from a selected piece of picture data to another selected piece of picture data.

8. An image display edit processing method according to claim 7 wherein said playback order is determined by a direction of an arrow on said connecting line.

9. An image-display edit processing method according to claim 7 wherein a type of said connecting line determines a special effect at an image-data change-over.

10. An image-display edit processing method according to claim 7 wherein duration of an image-data change-over is determined by the width of said connecting line.

11. An image editing apparatus having a display unit for displaying image data, said apparatus further comprising:

first display means for displaying a plurality of pieces of picture data each corresponding to a piece of image data on said display unit;

second display means for selecting pieces of picture data by the user and displaying display indicators representing a playback order to play back pieces of image data corresponding to said selected pieces of picture data by associating said display indicators with said selected pieces of picture data; and playback means for playing back pieces of image data corresponding to said selected pieces of picture data in said playback order specified by said display indicators wherein pieces of image data each corresponding to a selected piece of picture data are sequentially played back in said playback order specified by said display indicators before editing.

12. An image editing apparatus according to claim 11 further provided with third display means for displaying pieces of picture data by rearranging said selected pieces of picture data along a time axis in said playback order specified by said display indicators.

13. An image editing apparatus according to claim 11 wherein determination of a special effect at an image-data change-over and a duration of an image-data change-over are based on display attributes of said display indicators specifying said playback order.

14. An image editing apparatus according to claim 11 wherein said second display means displays said display indicators representing a playback order on said displayed pieces of picture data.

15. An image editing apparatus according to claim 14 wherein said display indicators for specifying said playback order are each represented by a connecting line drawn from a selected piece of picture data to another piece of picture data.

16. An image editing apparatus according to claim 15 wherein the type of said connecting line determines a special effect at an image-data change-over.

17. A storage medium for storing an image-display editing program to be executed on an image editing apparatus having a display unit for displaying image data, said image-display editing program including:

a step of displaying on said display unit a plurality of pieces of picture data each corresponding to a piece of image data;

a step of selecting pieces of picture data by the user and displaying display indicators representing a playback order to play back pieces of image data corresponding to said selected pieces of picture data by associating said display indicators with said selected pieces of picture data; and a step of playing back said pieces of image data corresponding to said selected pieces of picture data in said playback order specified by said display indicators wherein pieces of image data each corresponding to a selected piece of picture data are sequentially played back in said playback order specified by said display indicators before editing.

* * * * *